United States Patent
Le et al.

(10) Patent No.: US 8,155,513 B2
(45) Date of Patent: Apr. 10, 2012

(54) OFF CENTER MOTOR, GROUND GLASS ON CENTER POST WITH BALL BEARING(S), X-Y IMAGE POSITION ADJUSTMENT AND ON-THE-FLY BACK FOCUS ADJUSTMENT WITH LOCK DOWN ON 35MM SPINNING GROUND GLASS ADAPTERS

(76) Inventors: Hien Tu Le, Happy Valley, OR (US); Quyen Tu Le, Beaverton, OR (US)

( * ) Notice: Subject to any disclaimer, the term of this patent is extended or adjusted under 35 U.S.C. 154(b) by 428 days.

(21) Appl. No.: 12/420,960

(22) Filed: Apr. 9, 2009

(65) Prior Publication Data

US 2009/0256920 A1    Oct. 15, 2009

Related U.S. Application Data

(60) Provisional application No. 61/044,469, filed on Apr. 12, 2008.

(51) Int. Cl.
*G03B 17/00* (2006.01)
(52) U.S. Cl. .......................... 396/71; 348/345
(58) Field of Classification Search .................. 348/345; 396/71
See application file for complete search history.

(56) References Cited

U.S. PATENT DOCUMENTS

| | | | | |
|---|---|---|---|---|
| 4,095,257 A * | 6/1978 | Back | | 348/165 |
| 4,516,171 A * | 5/1985 | Yamazaki | | 348/97 |
| 4,988,173 A * | 1/1991 | Margolis | | 359/674 |
| 5,640,222 A * | 6/1997 | Paul | | 352/60 |
| 5,896,223 A * | 4/1999 | Tigliev et al. | | 359/388 |
| 7,092,025 B2 * | 8/2006 | Gabel et al. | | 348/335 |
| 7,720,368 B2 * | 5/2010 | Hurd | | 396/71 |
| 2002/0140944 A1 * | 10/2002 | Ueki et al. | | 356/512 |
| 2007/0297071 A1 * | 12/2007 | Wurster | | 359/707 |

* cited by examiner

*Primary Examiner* — Rodney Fuller
*Assistant Examiner* — Linda B Smith
(74) *Attorney, Agent, or Firm* — Michael Ries

(57) ABSTRACT

A video camera, having a body which supports a Depth of Field adapter and contains an image recording device comprises imaging optics having a disk shaped ground glass for rendering visible a real image; a rotatable post having a first end coupled to the ground glass at its center and a second end coupled to the body of the Depth of Field adapter; and a motor coupled to rotate the rotatable post to urge the ground glass to rotate, and where the Depth of Field adapter comprises first and second tubes which, when aligned, form a front tube of the Depth of Field adapter; a coupling ring coupled to align and join the first tube with the second tube; and a support member coupled to the first and second tubes to position the first and second tubes to be at the front of the optical path of the camera.

22 Claims, 6 Drawing Sheets

Groove in which the horse shoes slide in

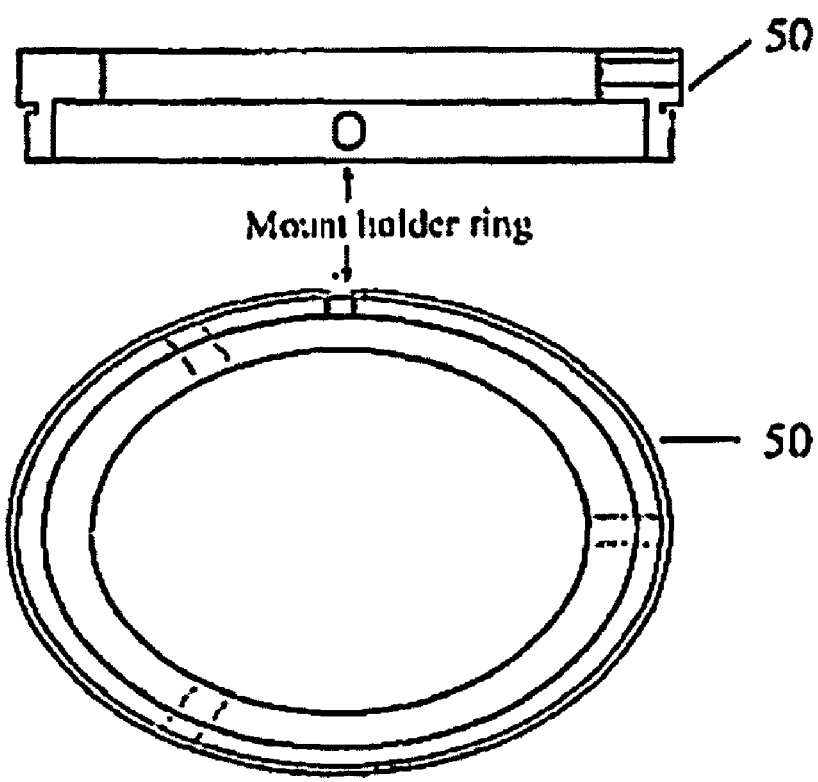

Fig. 9
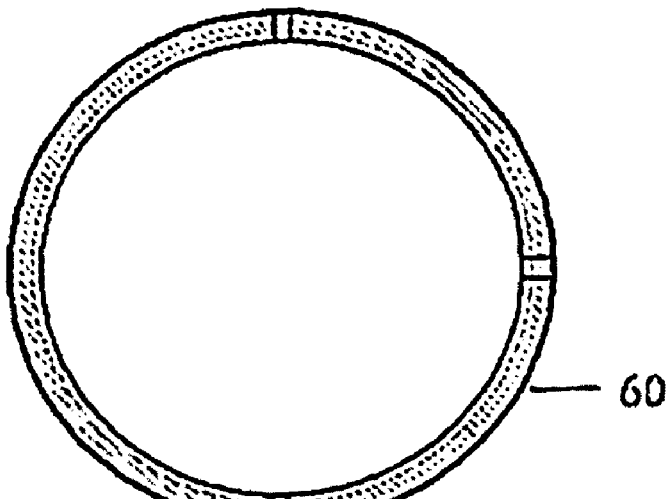
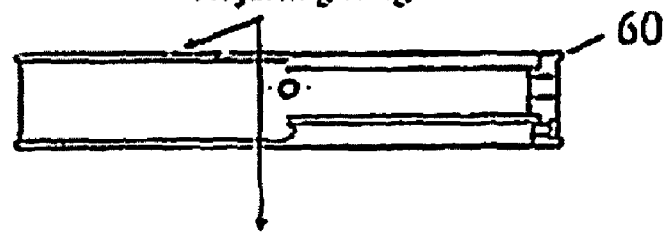
Adjusting Ring
Fig. 8
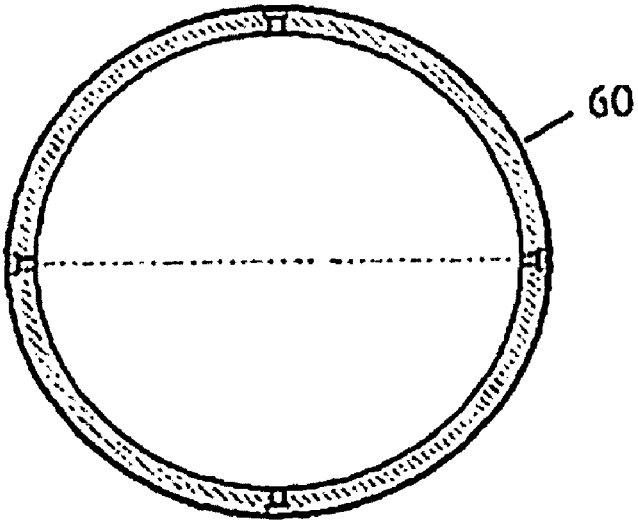
Fig. 10

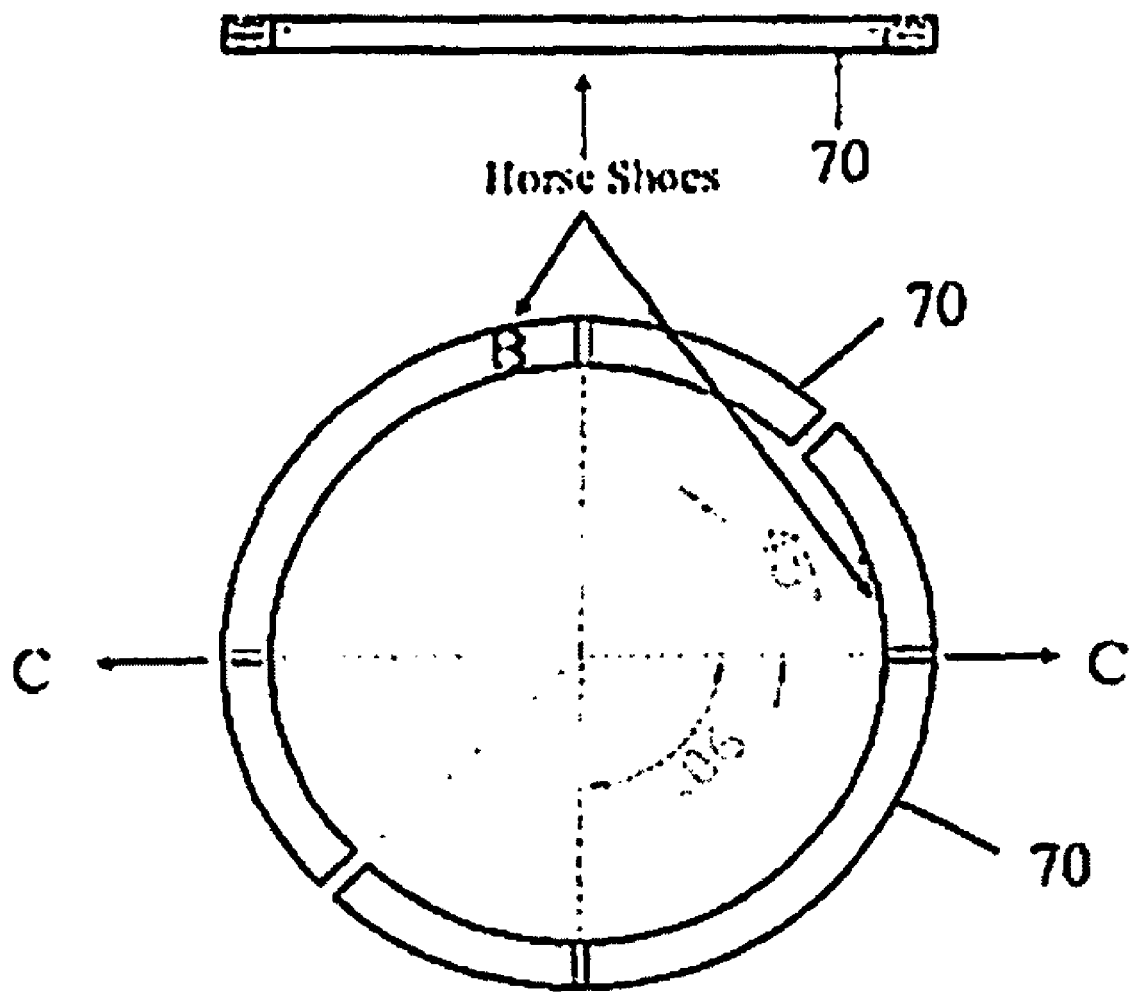

OFF CENTER MOTOR, GROUND GLASS ON CENTER POST WITH BALL BEARING(S), X-Y IMAGE POSITION ADJUSTMENT AND ON-THE-FLY BACK FOCUS ADJUSTMENT WITH LOCK DOWN ON 35MM SPINNING GROUND GLASS ADAPTERS

This application claims priority to U.S. Provisional Application 61/044,469 filed 12 Apr. 2008, the disclosure of which is incorporated herein by reference in its entirety.

BACKGROUND OF THE INVENTION

1. Field of the Invention

This invention relates to focusing devices for optical equipment and, more particularly, to a focusing device for optical equipment such as movie cameras and television cameras which have a picture-taking system or a range finder system.

2. Description of the Related Art

The invention relates to an optical device for a photographic camera, such as a video camera. When viewing an image an observer can easily distinguish between images from a film recording and those from a video camera, the optical impression of the film recordings generally being considered more pleasing. It is known that, apart from a lower resolution of the video image and an unsatisfactory contrast behavior compared with the film image, this effect is largely due to the considerable Depth of Field of the video image. On recording objects at a specific distance from the focal plane, in the case of a specific focal length and aperture, there is a fixed Depth of Field. It is generally the case that with increasing format size the Depth of Field decreases. Thus, compared with the ⅓ inch video format, the larger 35 mm film format has a Depth of Field lower by a factor of roughly five for the same diaphragm step and viewing angle.

In the case of digital image recording by a video camera, the image is recorded on an image recording device in the form of a photosensitive chip such as a CCD, which is small compared with a 35 mm recording format. Thus, the recorded video image has a much higher Depth of Field than the comparable film image. This characteristic can easily be perceived by the image viewer. The considerable Depth of Field of a video camera is undesirable for photographing purposes. Instead a limited Depth of Field is used as a design element, which is only possible to a very restricted extent with small recording formats.

To obtain the same Depth of Field as the 35 mm film camera with the same viewing angle and aperture, a Depth of Field adapter is placed in front of the video camera. The main function of the Depth of Field adapter is to take the image of the still camera lens or movie camera lens and project it on the focusing screen (also known as ground glass, or GG). The video camera then will capture the image on the focusing screen. Still camera lens or movie camera lens (such as a Nikon lens) is mounted to the adapter using a lens mount. The function of the lens mount is to keep the lens at a proper distance from the focusing screen so it will project sharp image on the focusing screen. This distance is usually called Flange Focal Distance, or FFD.

The focusing screen of the 35 mm is usually moving to hide the stationary grains of the focusing screen. The movement is usually by vibrating, oscillating or spinning. In a conventional spinning 35 mm adapter, the center of a round focusing screen is mounted onto the shaft of a motor. When the shaft of the motor spin, the focusing screen will spin with it hence hiding the stationary grains of the focusing screen. The problem with this method of mounting the focusing screen onto the shaft of a motor is that when the shaft of the motor wobbles, which all do, it will cause the focusing screen to wobble. When the focusing screen wobbles, the Flange Focal Distance will be constantly changing, thus making the image constantly going in and out of focus, meaning the image is less sharp. Another problem with this mounting method is that since the motor is normally big, it will block the view of the frame and to compensate for the blocked view, the focusing screen must be made bigger leading to a bigger overall design of the Depth of Field adapter.

Another problem that all Depth of Field adapters face is that due to manufacturing errors, change in temperature, the Flange Focal Distance of a lens changes, thus the projected image on the focusing screen is not sharp at a given distance. To overcome this, usually paper shims or adjustable screws on the lens mount are used to set the lens mount at a proper distance to achieve the proper Flange Focal Distance.

Yet another problem that all Depth of Field adapters face is that often times the image sensor of the video camera is offset from the center of the lens, and when the Depth of Field adapter is attached to the camera, the image on the focusing screen of the Depth of Field adapter is also shifted from the center. A normal fix for this is making the connection ring between the Depth of Field adapter and the camera lens a little loose to allow the whole adapter to shift and use the screws to hold it in place at proper center. This causes the connection between the Depth of Field adapter and the camera less stable.

SUMMARY OF THE INVENTION

The objective of the present invention is to obviate the disadvantages of prior art focusing devices. To this end, the present invention is directed to the provision of a focusing device, for video cameras, which permits a marked increase in the accuracy of focusing and sharpness of the image.

In an embodiment there is disclosed a photographic camera, such as a video camera, having a body which supports a Depth of Field adapter which is positioned at the front of the optical path and contains an image recording device of the camera at the end of the optical path comprising:

Imaging optics having a disk shaped ground glass imaging surface for rendering visible a real image;

A rotatable post having first and second ends, said first end coupled to said ground glass at its center and said second end of said post is coupled to the body of the Depth of Field adapter; and A motor having a shaft coupled to said rotatable post to urge said ground glass to rotate.

In another embodiment there is disclosed a photographic camera, such as a video camera, having a body which supports a Depth of Field adapter which is positioned at the front of the optical path and contains an image recording device of the camera at the end of the optical path comprising:

Imaging optics having a disk shaped ground glass imaging surface for rendering visible a real image;

A rotatable post having first and second ends, said first end coupled to said ground glass at its center and said second end of said post is coupled to the body of the Depth of Field adapter; and A motor having a shaft coupled to said rotatable post to urge said ground glass to rotate, and wherein said Depth of Field adapter comprises:

A first tube section and a second tube section which, when aligned, form a front tube of the Depth of Field adapter;

A coupling ring coupled to align and join said first tube section with said second tube section; and A support member coupled to said first and second tubes to position said first and second tube sections to be at the front of the optical path of the camera.

In still another embodiment there is disclosed a photographic camera, such as a video camera, having a body which supports a Depth of Field adapter which is positioned at the front of the optical path and contains an image recording device of the camera at the end of the optical path comprising:

Imaging optics having a disk shaped ground glass imaging surface for rendering visible a real image; A rotatable post having first and second ends, said first end coupled to said ground glass at its center and said second end of said post is coupled to the body of the Depth of Field adapter; and A motor having a shaft coupled to said rotatable post to urge said ground glass to rotate; and wherein said Depth of Field adapter located at the front of the optical path comprises:

A base member coupled to the camera body;

A tube section; An adjusting ring positioned between said base member and said tube section adapted to move said tube section toward or away from said base member; and a rotation limiting means coupled to prevent said adjusting ring from rotating.

The foregoing has outlined, rather broadly, the preferred feature of the present invention so that those skilled in the art may better understand the detailed description of the invention that follows. Additional features of the invention will be described hereinafter that form the subject of the claim of the invention. Those skilled in the art should appreciate that they can readily use the conception and specific embodiment as a base for designing or modifying the structures for carrying out the same purposes of the present invention and that such other features do not depart from the spirit and scope of the invention in its broadest form.

BRIEF DESCRIPTION OF THE DRAWINGS

Other aspects, features, and advantages of the present invention will become more fully apparent from the following detailed description, the appended claims, and the accompanying drawings in which similar elements are given similar reference numerals.

FIG. 1a is a view of a motor mounted off center for spinning a ground glass;

FIG. 1b is a side elevation of the ground glass assembly shown in FIG. 1a;

FIG. 6 is a front view of a mount holder ring;

FIG. 7 is a top view of the mount holder ring;

FIG. 8 is a side sectional view of the adjusting ring;

FIG. 9 is a top sectional view of the adjusting ring of FIG. 8;

FIG. 10 is a bottom sectional view of the adjusting ring of FIG. 8;

FIG. 11 is a partial sectional view of horse shoes; and

FIG. 12 is a view along C-C of FIG. 11.

DETAILED DESCRIPTION OF THE INVENTION

Figure 1:
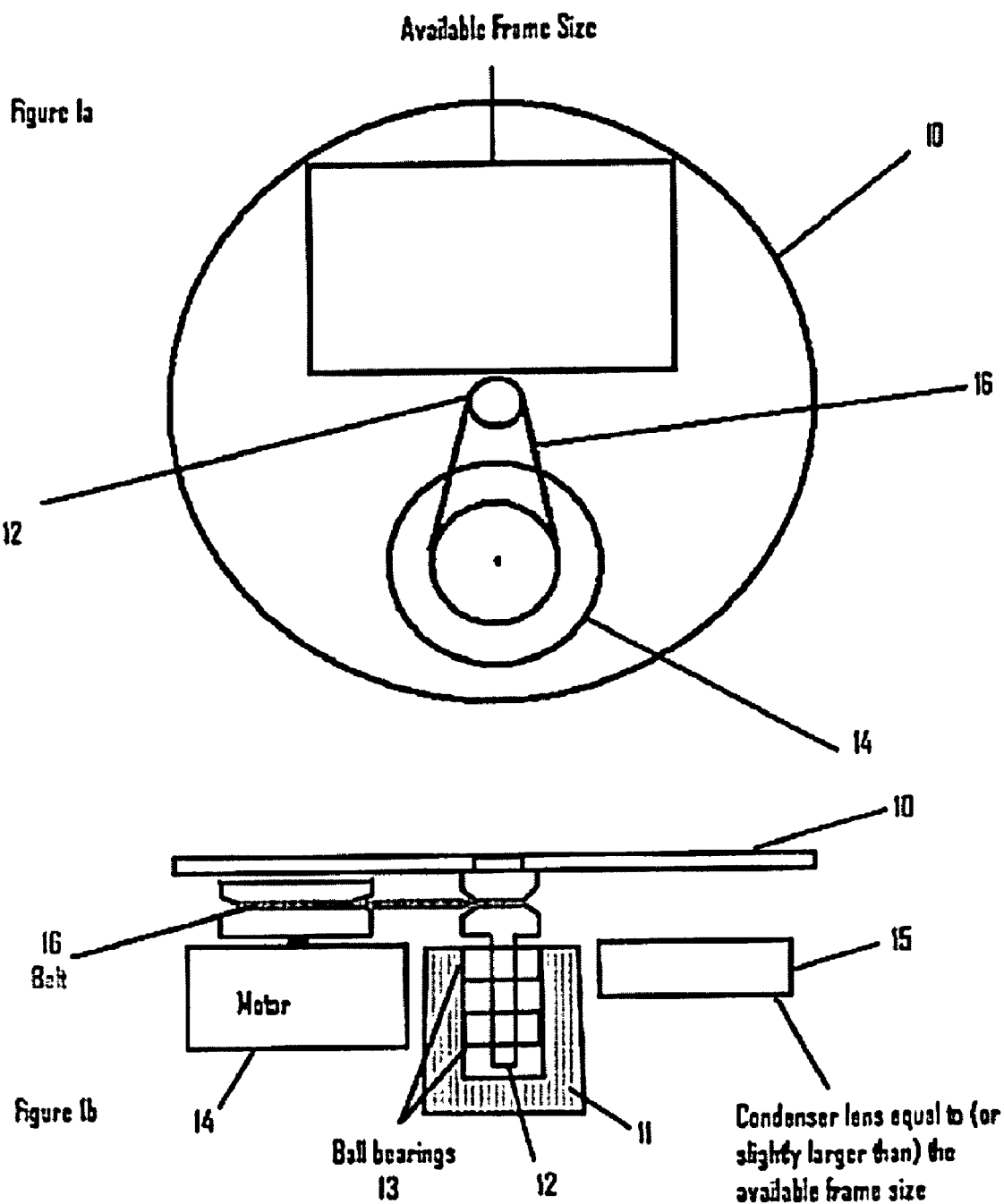

Referring to FIG. 1a, there is disclosed a top view of an off center mounted motor coupled to spin a ground glass focusing screen. The ground glass 10, which is shown as being transparent for illustrative purposes only, is securely mounted on a rotatable center post 12 by, for example, epoxy cement. The rotatable center post can be either fixed or movable coupled to adapter housing 11 with vibration reducing coupling such as ball or roller bearings 13 (shown in FIG. 1b) and is rotatable driven by off-center motor 14 via a friction drive such as belt drive 16. Both the motor and the rotatable center post vibration reducing coupling are couplet to a common support member to permit them to maintain a fixed position relative to each other when the ground glass is moved in the X and/or Y axis. Locating the motor 14 off-center provides a large usable optical frame for viewing. This is because the diameter of the center post is substantially smaller than the diameter of the motor.

The use of a center rotating post for mounting the ground glass using the vibration reducing coupling such as ball or roller bearings, in addition to providing a large optical viewing area, also provides better control of the Z movement, the wobble, of the ground glass. By reducing the Z movement of the ground glass, sharper images are produced because the Flange Focus Distance (FFD) can remain fixed. This feature of allowing the FFD to remain fixed also enables a user to capture an image at a higher shutter speed without seeing flickering on the movie.

If the CCD(s) of the camera is not centered, the image on the ground glass will appear shifted. To correct for this shift of the image which is caused by the not centered CCD(s), a user will normally shift the whole Depth of Field (DOF) adapter that is located in front of the camera.

In the invention here disclosed, the DOF adapter is not moved, only the condenser 15 and the ground glass 10 is moved. Thus, the DOF adapter, once set, is left in proper alignment with the camera body. This will result in a much more stable system.

A Depth of Field (DOF) adapter focuses an image which is projected by an external lens onto a focusing screen (or ground glass) located between an external lens and the camera's main lens. The focusing screen is where the photographic lens image is projected. The screen must be placed at precisely the correct distance from the flange focal mount of whatever lens is being used, referred to as the Flange Focal Distance (FFD). Finally, the front lens is a photographic or cinema lens that projects the image desired onto the focusing screen.

35 mm DOF adapters usually have a lens mount in front to allow a user to mount a lens to it. The Flange Focal Distance is the very important distance between the flange of the lens and the film plane. As a result of manufacturing errors and/or temperature, this distance is not normally set correctly. To overcome this incorrect setting, paper shims or adjustable screws are usually used to adjust the distance.

In the invention here disclosed this distance is accurately set by a first tube section and a second tube section which are joined and aligned with a coupling ring which is coupled to the tubes with threads. The first tube is coupled to the coupling ring with a clockwise thread and the second tube is coupled to the coupling ring with a counter-clockwise thread. Rotating the ring in one direction will move the tubes further apart, and rotating the ring in the reverse direction will move the tubes closer together. Structure is provided to allow the tubes to move toward or away from each other without rotating as the coupling ring is rotated. In another embodiment the second tube is fixed to the Depth of Field adapter body and the first tube is coupled to the coupling ring with threads. There is a trench within the second tube for the horse shoes that are attached to the coupling ring to travel circularly. Rotating the coupling ring in one direction will cause the first tube to move toward the second tube, and rotating the coupling ring in the other direction will cause the first tube to move away from the second tube. Structure is provided to allow the first tube to move toward or away from the second tube without rotating as the coupling ring is rotated. There is a screw from outside that goes through the coupling ring, when tighten, this screw will depress directly upon the horse shoes against the trench in the second tube, acting as a brake to stop the movement of the coupling ring once the desired position of the first tube has been achieved.

If the CCD of the camera is not centered, the image of the ground glass will appear shifted. To correct for this shift of the image caused by the not centered CCD, prior to this invention a user will shift the Depth of Field adapter which is located in front of the camera. With this invention, the Depth of Field adapter remains fixed and properly aligned, and only the ground glass and the condenser are shifted along its X-Y axis to center the image on the ground glass.

Figure 2:
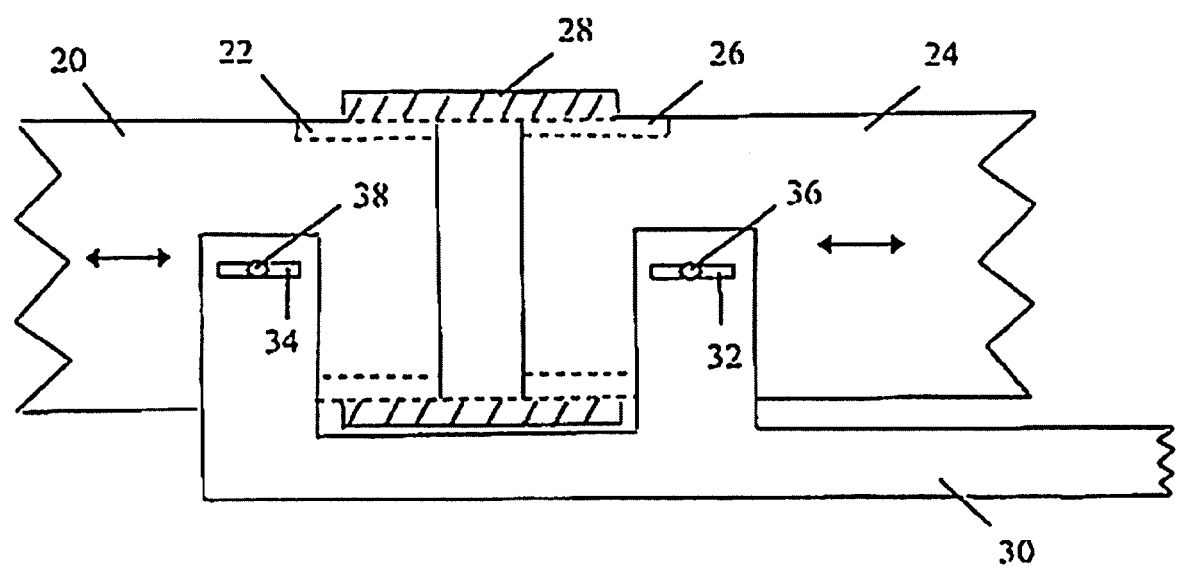
FIG. 2 is a side elevation view of the tube.

Referring to FIG. 2, in an embodiment of the invention the front tube of the adapter is divided into two separate sections 20, 22. One section 20 has a clockwise thread 22 and the other section 24 has a counter-clockwise thread 26. The two sections are connected to a coupling ring 28 that has a clockwise thread at one end and a counter-clockwise thread at the other end. When the two sections are coupled to the coupling ring 28, the flange focal distance is adjusted by turning the coupling ring 28 in one direction to urge the two sections 20, 24 to move closer to each other, or by turning the coupling ring in the other direction to urge the two sections 20, 24 to move further apart. A rigid support member 30 having slots 32, 34 which slidable receive pins 36, 38 coupled to the sections 20, 24 allow the sections to move toward and away from each other, but prevent the sections from rotating.

Figure 4:
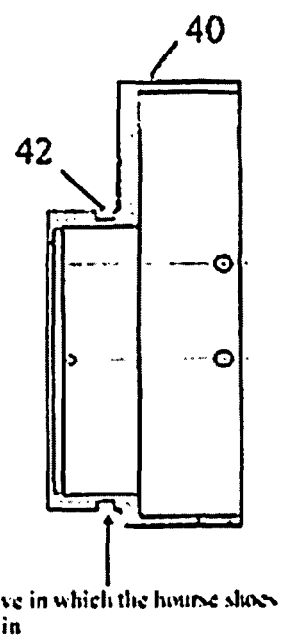
FIG. 4 is a sectional view along A-A of FIG. 3.
Figure 3:
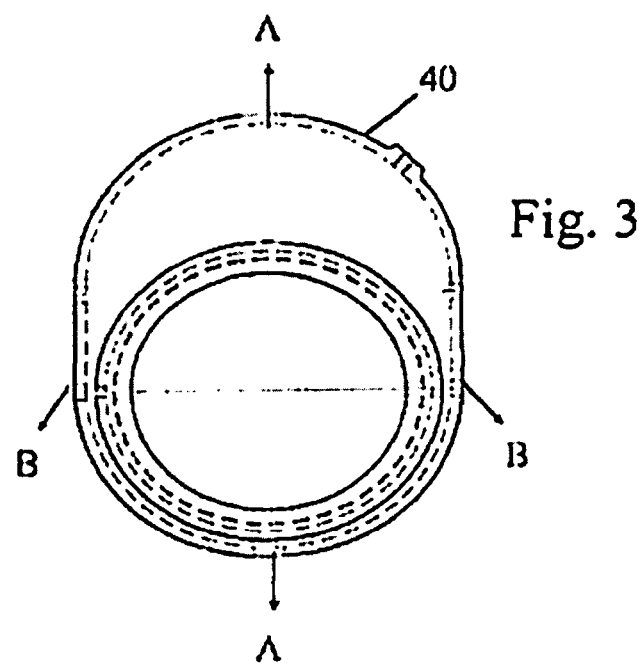
FIG. 3 shows a front view of the Flange Focal Distance adjusting assembly.
Figure 5:
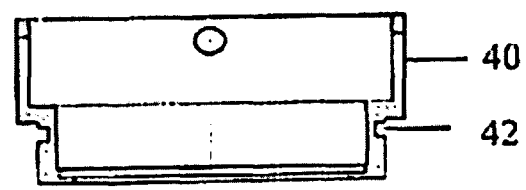
FIG. 5 is a view along B-B of FIG. 3.

Referring to FIGS. 3-12, there is shown another embodiment of the invention where the tube of a DOF adapter is movably coupled to move toward a camera body and away from a camera body. FIG. 3 shows a front view of the base member, FIG. 4 is a sectional view along A-A of FIG. 3, and FIG. 5 is a view along B-B of FIG. 3. FIG. 6 is a front view of a mount holder ring, and FIG. 7 is a top view of the mount holder ring. FIG. 8 is a side sectional view of the adjusting ring, FIG. 9 is a top sectional view of the adjusting ring of FIG. 8, and FIG. 10 is a bottom sectional view of the adjusting ring of FIG. 8. FIG. 11 is a partial sectional view of horse shoes, and FIG. 12 is a view along C-C of FIG. 11.

The structure for supporting and positioning the tube of a DOF adapter includes base member 40 having groves 42 (FIGS. 3-5), a mount holder ring 50 (FIGS. 6, 7), an adjusting ring 60 (FIGS. 8-10), and horse shoes 70 (FIGS. 11, 12). Horse shoes 70 are slidably supported in the groves 42 of the base 40. Adjusting ring 60 connect to the horse shoes in one end and the other end, which has a female thread, connects to the mount holder ring 50, which has a male thread. A rotation limiting means such as a pin coupled to the base member allows the mount holder ring 50 to travel in and out, without rotating. Thumb screws (not shown) that pass through the adjustment ring are provided to stop the movement of the mount holder ring. When the adjustment ring is rotating (the horse shoes are sliding within the groove of the base), the mount holder ring will travel in or out to adjust the Flange Focal Distance. Once the correct FFD is achieved, the thumb screws are used to lock the mount holder ring at the desired position.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A photographic camera, such as a video camera, having a body which supports a Depth of Field adapter which is positioned at the front of the optical path and contains an image recording device of the camera at the end of the optical path comprising:
    imaging optics located is said depth of Field adapter having a disk shaped ground glass imaging surface and a condenser for rendering visible a real image;
    a rotatable post having first and second ends, said first end coupled to said ground glass at its center and said second end of said post is coupled to the body of the Depth of Field adapter with a vibration reducing coupling; and
    a motor having a shaft coupled to said rotatable post to urge said ground glass to rotate.

2. The apparatus of claim 1 wherein said second end of said rotatable post is rotatably coupled to said body of the Depth of Field adapter via said vibration reducing coupling.

3. The apparatus of claim 2 wherein said vibration reducing coupling is ball or roller bearings.

4. The apparatus of claim 2 wherein said motor shaft is coupled to urge said rotatable post to rotate via a friction drive.

5. The apparatus of claim 4 wherein said friction drive comprises a belt.

6. The apparatus of claim 1 wherein one or both of said ground glass and said condenser is shifted along at least one of its X-Y axis to correct for a shift of the image caused by a not centered CCD(s) of the video camera.

7. The apparatus of claim 5 wherein said rotatable post has a diameter that is less than the diameter of said motor and said motor is located along side said rotatable post.

8. The apparatus of claim 1 wherein said Depth of Field adapter located at the front of the optical path comprises:
    a first tube section and a second tube section which, when aligned, form a front tube of the Depth of Field adapter;
    a coupling ring coupled to align and join said first tube section with said second tube section; and
    a support member coupled to said first and second tubes to position said first and second tube sections to be at the front of the optical path of the camera.

9. The apparatus of claim 8 wherein said coupling ring, when turned clockwise or counter-clockwise, moves the first tube section toward or away from the second tube section.

10. The apparatus of claim 9 wherein said coupling ring has a female thread that engages a male thread at an end of said first tube section.

11. The apparatus of claim 9 wherein said coupling ring has a female clockwise thread at one end that engages a male clockwise thread at said one end of said first tube section and a female counter-clockwise thread at the other end that engages a male counter-clockwise thread at said other end of said second tube section.

12. The apparatus of claim 11 wherein said support member is slidably coupled to said first and second tube sections.

13. The apparatus of claim 12 wherein said support member has slots that engage pins on said first and second tube sections where said slots and pins allow said first and second tube sections to move toward and away from each other but prevent said tube sections from rotating.

14. The apparatus of claim 12 wherein said second end of said rotatable post is rotatably coupled to said Depth of Field adapter body with ball of roller bearings.

15. The apparatus of claim 14 wherein said motor shaft is coupled to urge said rotatable post to rotate via a friction drive.

16. The apparatus of claim 1 wherein said depth of field adapter located at the front of the optical path comprises:
- a base member coupled to the Depth of Field adapter body;
- a tube section;
- a rotatable adjusting ring positioned between said base member and said tube section adapted to move said tube section toward said base member when rotated in a first direction or away from said base member when rotated in a second direction; and
- a rotation limiting means coupled to prevent said tube section from rotating.

17. The apparatus of claim 16 where there is a trench within the said base member and there are horse shoes of crescent shape connected to the said rotatable adjusting ring said horse shoes would travel within said trench to limit said rotatable adjusting ring to move out of its place.

18. The apparatus of claim 17 where there is a screw from the outsite of the said rotatable adjusting ring that when tighten, will depress directly onto the said horse shoe against the said trench on the said base, acting like a brake to stop the movement of the said rotatable adjusting ring once the desired position of the said tube section has been achieved.

19. The apparatus of claim 16, wherein said rotation limiting means is a pin.

20. The apparatus of claim 16, wherein said second end of said rotatable post is rotatably coupled to said camera body with ball or roller bearings.

21. The apparatus of claim 18, wherein said motor shaft is coupled to urge said rotatable post to rotate via a friction drive.

22. The apparatus of claim 19, wherein said friction drive is a belt.

* * * * *